(12) United States Patent
Beutel et al.

(10) Patent No.: US 8,609,294 B2
(45) Date of Patent: Dec. 17, 2013

(54) METHOD TO PROVIDE ELECTRICAL INSULATION BETWEEN CONDUCTIVE PLATES OF A HYDROGEN FUEL CELL

(75) Inventors: Matthew J. Beutel, Webster, NY (US); Ronald L. James, North Chili, NY (US); Daniel P. Miller, Victor, NY (US); Steven J. Spencer, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 491 days.

(21) Appl. No.: 12/909,071

(22) Filed: Oct. 21, 2010

(65) Prior Publication Data

US 2012/0100454 A1    Apr. 26, 2012

(51) Int. Cl.
*H01M 8/02*    (2006.01)
(52) U.S. Cl.
USPC .......................................... 429/457; 429/518
(58) Field of Classification Search
USPC .................................................. 429/457, 518
See application file for complete search history.

(56) References Cited

U.S. PATENT DOCUMENTS

| 2004/0096725 | A1* | 5/2004 | Mao et al. ................. 429/38 |
| 2007/0082251 | A1 | 4/2007 | Inagaki |
| 2007/0207372 | A1 | 9/2007 | Kikuchi et al. |
| 2008/0248338 | A1* | 10/2008 | Yano et al. ................. 429/13 |

* cited by examiner

*Primary Examiner* — Patrick Ryan
*Assistant Examiner* — Ladan Mohaddes
(74) *Attorney, Agent, or Firm* — Fraser Clemens Martin & Miller LLC; J. Douglas Miller (57) ABSTRACT

A subassembly for a fuel cell includes a fuel cell plate having a first side and a second side. Each of the first side and the second side has a flow field disposed between a pair of headers. An insulating spacer abuts the first side of the fuel cell plate and is disposed adjacent a perimeter of the fuel cell plate. A unitized electrode assembly includes a subgasket, a membrane electrode assembly, and a pair of diffusion medium layers. The membrane electrode assembly has an electrolyte membrane sandwiched between a pair of electrodes. The membrane electrode assembly is sandwiched between the pair of diffusion medium layers. The subgasket surrounds, and is coupled to, the membrane electrode assembly. The subgasket abuts the insulating spacer. An elastomeric seal abuts the second side of the fuel cell plate.

20 Claims, 5 Drawing Sheets

METHOD TO PROVIDE ELECTRICAL INSULATION BETWEEN CONDUCTIVE PLATES OF A HYDROGEN FUEL CELL

FIELD OF THE INVENTION

The present disclosure relates to a fuel cell and, more particularly, to a subassembly for the fuel cell.

BACKGROUND OF THE INVENTION

A fuel cell has been proposed as a clean, efficient, and environmentally responsible power source for electric vehicles and various other applications. Individual fuel cells can be stacked together in series to form a fuel cell stack for various applications. The fuel cell stack is capable of supplying a quantity of electricity sufficient to power a vehicle. In particular, the fuel cell stack has been identified as a potential alternative for the traditional internal-combustion engine used in modern automobiles.

One type of fuel cell is the polymer electrolyte membrane (PEM) fuel cell. The PEM fuel cell includes three basic components: an electrolyte membrane; and a pair of electrodes, including a cathode and an anode. The electrolyte membrane is sandwiched between the electrodes to form a membrane-electrode-assembly (MEA). The MEA is typically disposed between porous diffusion media (DM), such as carbon fiber paper, which facilitates a delivery of reactants, such as hydrogen to the anode and oxygen to the cathode. An MEA and DM preassembled together with a subgasket for the separation of reactant fluids is known as a unitized electrode assembly (UEA).

In the electrochemical fuel cell reaction, the hydrogen is catalytically oxidized in the anode to generate free protons and electrons. The protons pass through the electrolyte to the cathode. The electrons from the anode cannot pass through the electrolyte membrane, and are instead directed as an electric current to the cathode through an electrical load, such as an electric motor. The protons react with the oxygen and the electrons in the cathode to generate water.

The electrolyte membrane is typically formed from a layer of ionomer. The electrodes of the fuel cell are generally formed from a finely-divided catalyst. The catalyst may be any electrocatalyst that catalytically supports at least one of an oxidation of hydrogen or methanol, and a reduction of oxygen for the fuel cell electrochemical reaction. The catalyst is typically a precious metal such as platinum or another platinum-group metal. The catalyst is generally disposed on a carbon support, such as carbon black particles, and is dispersed in an ionomer.

The electrolyte membrane, the electrodes, the DM, and a subgasket, for example, in the form of the UEA, are disposed between a pair of fuel cell plates. The pair of fuel cell plates constitutes an anode plate and a cathode plate. Each of the fuel cell plates may have a plurality of channels formed therein for distribution of the reactants and coolant to the fuel cell. The fuel cell plate is typically formed by a conventional process for shaping sheet metal such as stamping, machining, molding, or photo etching through a photolithographic mask, for example. In the case of a bipolar fuel cell plate, the fuel cell plate is typically formed from a pair of unipolar plates, which are then joined to form the bipolar fuel cell plate.

The bipolar fuel cell plate assembly of a fuel cell must be electrically isolated from each other in order for the fuel cell to operate correctly. Typical fuel cell plates are metallic and can be plastically deformed, which effectively reduces the designed nominal voltage isolation distance for the fuel cell assembled from the fuel cell plates. When the distance between the fuel cell plates of the compressed fuel cell falls below the subgasket thickness of the UEA for the cell, a pressure is applied to the subgasket. It has been demonstrated that the resulting plate pressure generated by deformation, e.g., a bent plate edge, is adequate to pierce the subgasket under normal operating conditions of the fuel cell.

Where the subgasket has been pierced completely, plate-to-plate contact can occur. The deformation of the fuel cell plate resulting in the plate-to-plate contact is typically due to variance in size of the manufactured fuel cell plates, or a deformation of the edges of the fuel cell plates during assembly. The typical fuel cell also relies on compressed seal interfaces, which alignment or misalignment of the same can result in plate-to-plate contact under compression during assembly of the fuel cell.

A known method for militating against plate-to-plate contact includes overmolding an elastomer seal over edge profiles of the fuel cell plates, for example, as disclosed in U.S. Pat. Appl. Pub. No. 2007/207372 to Kikuchi et al., the entire disclosure of which is hereby incorporated herein by reference. It is also known to employ a resin frame and adhesively-bonded fuel cell plates, for example, as disclosed in U.S. Pat. Appl. Pub. No. 2007/082251 to Inagaki, the entire disclosure of which is hereby incorporated herein by reference. The overmolding of the elastomer seal, and the employment of the resin frame and adhesively-bonded fuel cell plates, is undesirably time consuming and cost prohibitive.

There is a continuing need for a subassembly for the manufacture of a fuel cell that militates against plate-to-plate contact and subsequent plate-to-plate electrical shorting of the fuel cell at the perimeter edges of fuel cell plates. Desirably, the subassembly minimizes the deformation of the fuel cell plate during assembly and operation, is inexpensive and utilizes existing adhesive for retention, militates against a tearing of a subgasket at the perimeter edges of the fuel cell plates, and permits for tolerance variation in an outer perimeter of a finished unitized electrode assembly (UEA) component to minimize a trimming of the outer perimeter trim after assembly of the fuel cell.

SUMMARY OF THE INVENTION

In concordance with the instant disclosure, a subassembly for the manufacture of a fuel cell that prevents plate-to-plate contact and subsequent plate-to-plate shorting of the fuel cell at the perimeter edges of fuel cell plates, and that reduces the deformation of the fuel cell plate during assembly and operation, is inexpensive and utilizes existing adhesive for retention, militates against a tearing of a subgasket at the perimeter edges of the fuel cell plates, and permits for tolerance variation in an outer perimeter of a finished unitized electrode assembly (UEA) component to minimize a trimming of the outer perimeter trim after assembly of the fuel cell, is surprisingly discovered.

In one embodiment, a subassembly for a fuel cell includes a fuel cell plate having a first side and a second side. Each of the first side and the second side has a flow field disposed between a pair of headers. An insulating spacer abuts the first side of the fuel cell plate and is disposed adjacent a perimeter of the fuel cell plate. A unitized electrode assembly includes a subgasket and a membrane electrode assembly disposed between a pair of diffusion medium layers. The membrane electrode assembly has an electrolyte membrane sandwiched between a pair of electrodes. The subgasket surrounds, and is coupled to, the membrane electrode assembly. The subgasket abuts the insulating spacer. An elastomeric seal abuts the second side of the fuel cell plate.

In another embodiment, a fuel cell includes a pair of the sub-assemblies arranged in a stack. The elastomeric seal of one of the sub-assemblies abuts the subgasket of the other of the sub-assemblies.

In a further embodiment, a fuel cell stack includes a plurality of fuel cells arranged in a stack.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner.

With reference to FIGS. 1-2 and 4-7, the present disclosure includes a subassembly 2 for a fuel cell 4. The subassembly 2 includes a fuel cell plate 6, an insulating spacer 8, a unitized electrode assembly 10, and an elastomeric gasket or seal 12 arranged in a stack. The subassembly 2 may be aligned in pairs to form the fuel cell 4, and a plurality of the fuel cells 4 aligned in a stack to form a fuel cell stack 14 (shown in FIG. 3).

The fuel cell plate 6 of the subassembly 2 includes a first side 16 and a second side 18. The fuel cell plate 6 may be a bipolar plate or a unipolar plate, as desired. Each of the first side 16 and the second side 18 may have a flow field 20 disposed between a pair of headers 22. The flow field 20 may have a plurality of flow channels formed therein that define a flow path between the headers 22 on opposite sides of the fuel cell plate 6. The header 22 includes a plurality of apertures 24. The apertures 24 of the fuel cell plate 6 may define, in combination with one or more additional components of the subassembly 2, one of an anode inlet, an anode outlet, a cathode inlet, a cathode outlet, a coolant inlet, and a coolant outlet of the subassembly 2 for the fuel cell 4, when assembled.

The insulating spacer 8 abuts the first side 16 of the fuel cell plate 6. The insulating spacer 8 is disposed adjacent a perimeter 26 of the fuel cell plate 6. The insulating spacer 8 follows the contour of the fuel cell plate 6, regardless of the shape, In particular, the insulating spacer 8 is disposed between the apertures 24 and the perimeter 26 of the fuel cell plate 6. In a particular embodiment, the insulating spacer 8 is substantially flush with the perimeter 26 of the fuel cell plate 6. The insulating spacer 8 may be slightly larger in footprint than the fuel cell plate 6, for example, having an overhang up to about 2 mm to ensure electrical insulation between the fuel cell plates 6. For example, the insulating spacer 8 may have a shape that substantially conforms to a shape of the perimeter 26 of the fuel cell plate 6. Other suitable shapes for the insulating spacer 8 may also be selected, as desired.

The unitized electrode assembly 10 of the subassembly 2 includes a subgasket 28, and a membrane electrode assembly 30 disposed between a pair of diffusion medium layers 32. The membrane electrode assembly 30 includes an electrolyte membrane (not shown) sandwiched between a pair of electrodes (not shown). The subgasket 28 surrounds the membrane electrode assembly 30.

The subgasket 28 is coupled to the membrane electrode assembly 30 and abuts the insulating spacer 8. In a particular embodiment, an adhesive is disposed between the subgasket 28 of the unitized electrode assembly 10 and the insulating spacer 8 and plate 6. The adhesive may be a layer of thermal adhesive disposed on the subgasket 28 of the unitized electrode assembly 10, for example. As a non-limiting example, the adhesive is an ethyl vinyl acetate adhesive that is disposed on one surface of the subgasket 28. The adhesive on the subgasket 28 secures the unitized electrode assembly 10 to the insulating spacer 8. It should be understood that the means for attaching the insulating spacer 8 to the subgasket 28 may be an existing micro-seal adhesive of the subgasket 28 that is used to secure the unitized electrode assembly 10 to the fuel cell plate 6 when the insulating spacer 8 is not employed. Additional adhesives are not required, thereby minimizing a complexity of assembly for the fuel cell 4. A skilled artisan should appreciate that other types of adhesive may also be employed within the scope of the present disclosure.

Figure 1:
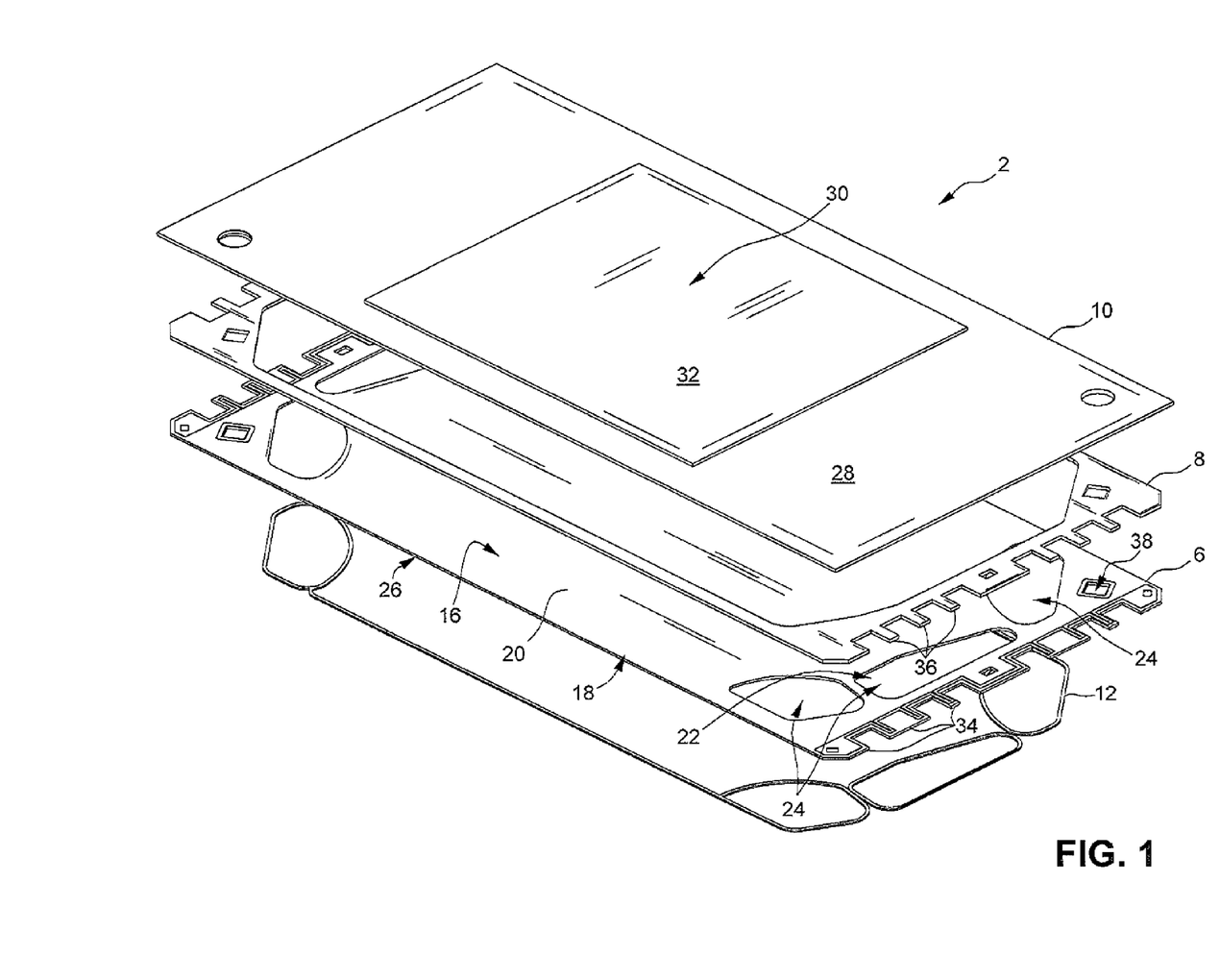
FIG. 1 is an exploded top perspective view of a subassembly for a fuel cell including the insulating spacer according to one embodiment of the present disclosure.
Figure 2:
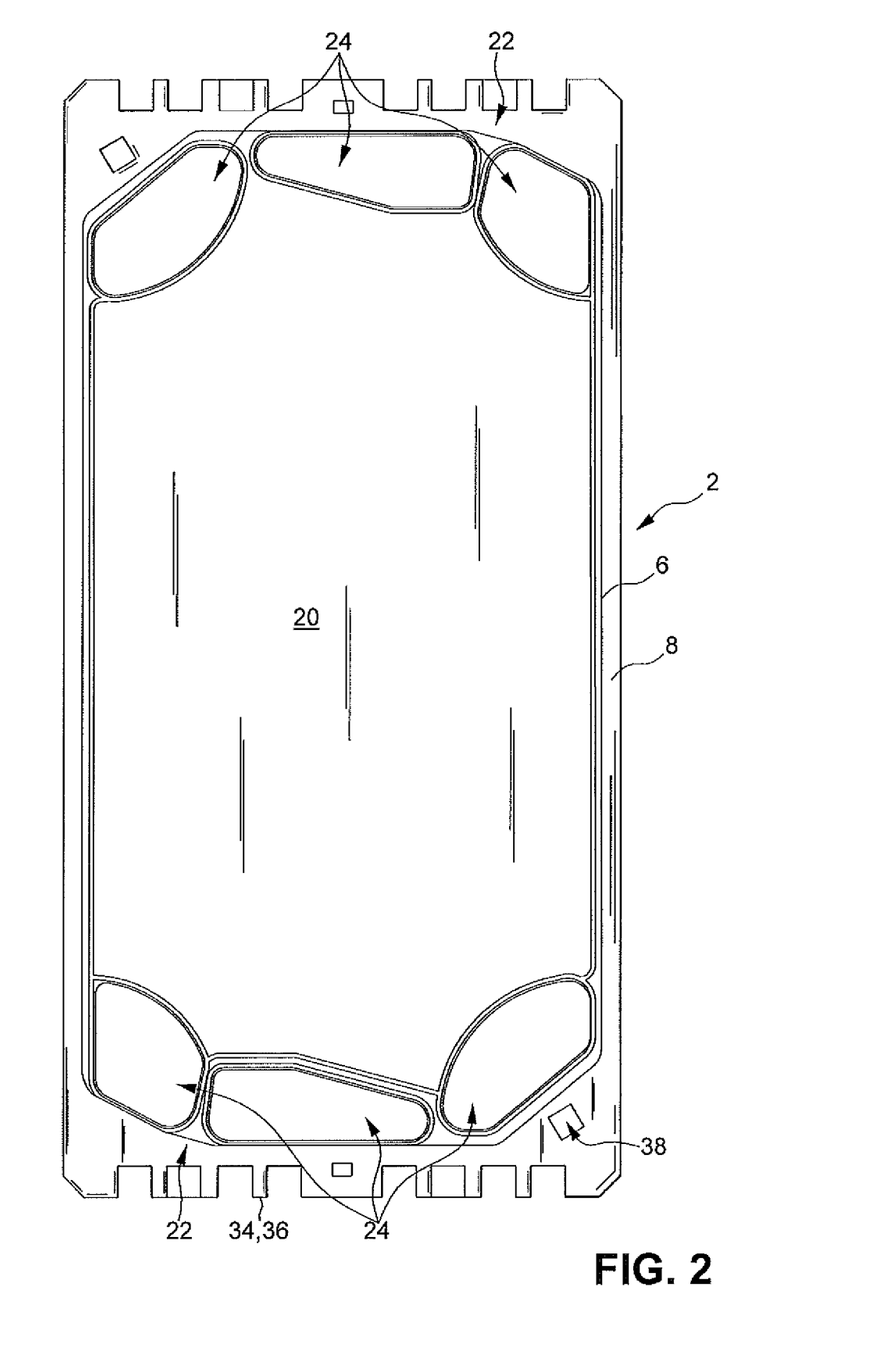
FIG. 2 is a top plan view of the subassembly illustrated in FIG. 1 without a unitized electrode assembly to show the disposition of the insulating spacer on a fuel cell plate.

As shown in FIG. 1, the subgasket 28 may be provided as a substantially planar sheet surrounding the membrane electrode assembly 30. A plurality of apertures 33, for example, as shown in FIGS. 3-7, may be formed in the subgasket 28. The apertures 33 may be formed in the subgasket 28 either before or after assembly of the unitized electrode assembly 10. The apertures 33 of the subgasket 28 cooperate with the apertures 24 of the fuel cell plate 6 to define one of the anode inlet, the anode outlet, the cathode inlet, the cathode outlet, the coolant inlet, and the coolant outlet of the subassembly 2 for the fuel cell 4 when assembled.

The subassembly 2 of the present disclosure further includes the elastomeric seal 12. The elastomeric seal 12 abuts the second side 18 of the fuel cell plate 6, and isolates coolant from reactants, and reactants from other reactants, within the subassembly 2. The elastomeric seal 12 may be formed from a resilient rubber, for example, a polyurethane rubber having sufficient resistance to the temperatures and environmental conditions associated with operation of the fuel cell 4. The elastomeric seal 12 may be retained only by compression of the elastomeric seal 12 against the fuel cell plate 6 when the subassembly 2 is installed in the fuel cell 4. The elastomeric seal 12 may exhibit adhesive attraction to the fuel cell plate 6, and be positioned on the fuel cell plate 6 and held by the adhesive attraction until compression is applied.

In particular embodiments, an adhesive is not employed to retain the elastomeric seal 12 against the fuel cell plate 6.

The subgasket 28 of the unitized electrode assembly 10 separates the anode and cathode reactant streams for the fuel cell 4. In most cases, the subgasket 28 also provides some electrical insulation between anode and cathode fuel cell plates 6 for the fuel cell 4, particularly in the cases where the designed clearances or gaps for the fuel cell 4 are nonexistent. The insulating spacer 8 is disposed outside of the elastomerically sealed area of the subassembly 2, and is therefore not exposed to the fuel cell reactants. The desired material properties for the insulating spacer 8 are therefore different from the desired material properties for the subgasket 28, which is exposed to fluids and internal conditions of the fuel cell 4. The insulating spacer 8 is also isolated from the highly humidified conditions that are on the inboard side of the elastomeric seal 12. Accordingly, materials may be used for the insulating spacer 8 that are different from, and relatively inexpensive compared to, the materials for the subgasket 28 of the unitized electrode assembly 10. Such expensive materials would otherwise be required for the insulating spacer 8 if the insulating spacer 8 crossed the elastomeric seal 12, in order to protect against water absorption causing swell and weakening of the insulating spacer 8.

Additionally, there are design limitations that make it undesirable for the insulating spacer 8 to extend inboard across the seal 12. Physically, space within the subassembly 2 is limited, and if an edge of the insulating spacer 8 is stopped short, the seal 12 that crosses over the edge will result in an undesirable leakage.

In a particular embodiment, the insulating spacer 8 is formed from an electrically nonconductive and substantially nonelastomeric material. It is desirable that the insulating spacer 8 be nonelastomeric in order to militate against a variation in total height of the fuel cell 4 upon assembly. The insulating spacer 8 does not deflect substantially with application of a pressure associated with typical operation of the fuel cell 4. For example, the insulating spacer 8 may be formed from one of a plastic and a composite material exhibiting primarily plastic deformation upon application of the pressure. In certain embodiments, the plastic material employed for the insulating spacer 8 is one of polyethylene terephthalate and polyethylene naphthalate. Other electrically nonconductive and substantially nonelastomeric materials may also be used, as desired.

The insulating spacer 8 also has a rigidity sufficient to militate against a puncturing thereof by a deformed edge at the perimeter 26 of the fuel cell plate 6. One of ordinary skill in the art should appreciate that the deformed edge may be the result of variance in size of the fuel cell plate 6 and a pressure associated with compression of the subassembly 2 during installation in the fuel cell 4. It should be appreciated that a Young's modulus and tensile strength providing the sufficient rigidity under fuel cell operation conditions may be selected for the material. As one nonlimiting example, the insulating spacer 8 may have a Young's modulus of at least about 2700 MPa, and a tensile strength of at least about 50 MPa. Lower Young's modulus and tensile strength may be employed, depending on other properties impacting the puncture resistance of the material. One of ordinary skill in the art may select the material having sufficient rigidity and puncture resistance for the insulating spacer 8, as desired.

It should be understood that the thickness of the insulating spacer 8 may be selected so that the deformed edge of one of the fuel cell plates 6 may only partially penetrate the surface of the insulating spacer 8. Where the deformed edge of one of the fuel cell plates 6 at least partially penetrates the surface of the insulating spacer 8, a pressure that a point defect in the edge of the fuel cell plate 6 would otherwise apply to the insulating spacer 8 is minimized.

The insulating spacer 8 may further have a thickness greater than a thickness of the adjacent fuel cell plate 6, for example. It should be appreciated that plate assembly thickness varies based upon the form features within the part geometry. Illustratively, the insulating spacer 8 may have a thickness from about twenty-five percent (25%) to about one hundred percent (100%) greater than an average thickness of the fuel cell plate 6, the average thickness of the fuel cell plate 6 being a combined material thickness of an anode plate and a cathode plate forming the fuel cell plate 6. In a particular embodiment, the insulating spacer 8 has a thickness from about twenty-five percent (25%) to about seventy-five percent (75%). For example, where the fuel cell plate 6 has the average thickness of approximately 150 microns, the insulating spacer 8 may have the thickness between about 190 microns and about 260 microns. A skilled artisan may employ other suitable dimensions for the fuel cell plate 6 and the insulating spacer 8, as desired.

At least one of the headers 22 of the fuel cell plate 6 includes outwardly projecting perimeter elements 34. The insulating spacer 8 also includes outwardly projecting perimeter elements 36 that substantially correspond with at least a portion of the outwardly projecting perimeter elements 34 of the fuel cell plate 6.

In one example, the outwardly projecting perimeter elements 36 of the insulating spacer 8 substantially cover all of the projecting perimeter elements 34 of the fuel cell plate 6 except a predetermined portion for electrical communication, for example, with external equipment. The exposed one of the outwardly projecting perimeter elements 34 may be a cell voltage monitor tab, for example. It should be understood that the insulating spacer 8 may cover a portion of the exposed one of the outwardly projecting perimeter elements 34 of the fuel cell plate 6.

In a further example, each of the fuel cell plate 6, the insulating spacer 8, and the subgasket 28 of the unitized electrode assembly 10 may each include datum holes 38. The datum holes 38 of the fuel cell plate 6, the insulating spacer 8, and the subgasket 28 cooperate to align the insulating spacer 8, the fuel cell plate 6, and the unitized electrode assembly 10 with datum rods (not shown) during assembly of the fuel cell 4.

Figure 8:
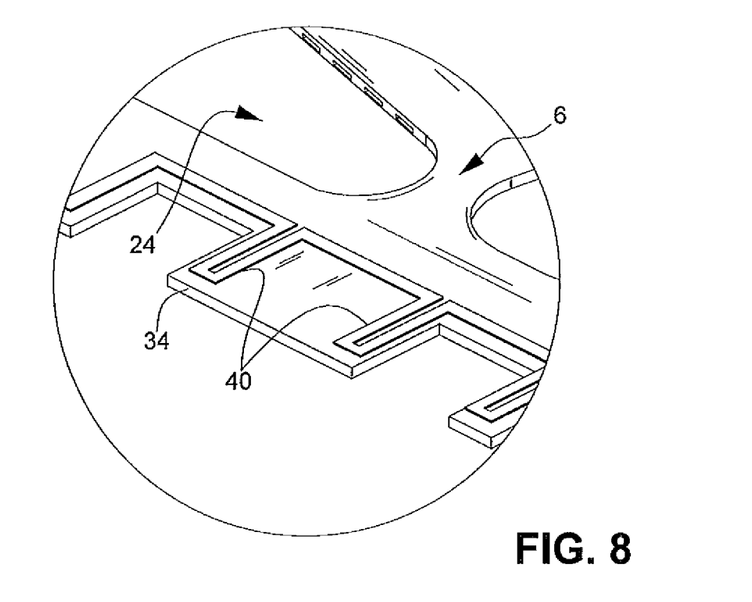
FIG. 8 is an enlarged fragmentary top perspective view of a fuel cell plate indicated by circle 8 in FIG. 6, and further showing stamped plate features for use with the insulating spacer of the present disclosure.

With particular reference to FIG. 8, the fuel cell plate 6 may include stamped form features 40. The stamped form features 40 may be raised portions on the surface of the fuel cell plate 6. The stamped form features 40 are disposed adjacent the insulating spacer 8, for example, on the outwardly projecting perimeter elements 34, and facilitate a retaining of the insulating spacer 8 when the fuel cell 4 is assembled. The stamped form features 40 may further facilitate a heat pressing and curing of the adhesive on the subgasket 28 to the insulating spacer 8, during formation of one of the subassembly 2 and the fuel cell 4.

Figure 3:
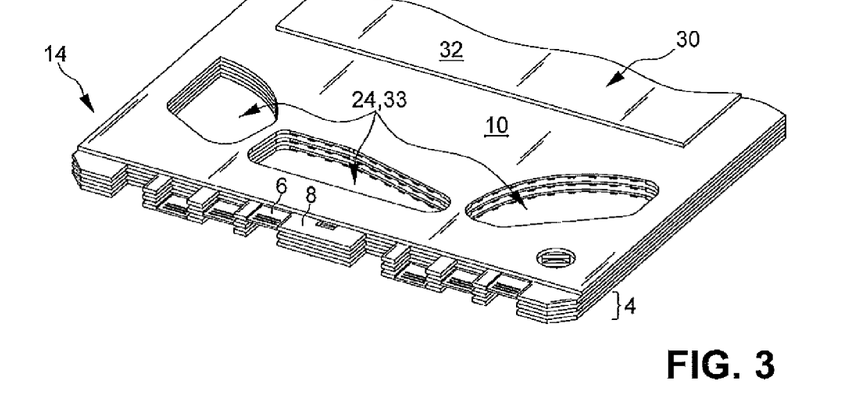
FIG. 3 is a fragmentary top perspective view of a fuel cell having a plurality of the subassemblies illustrated in FIG. 1.
Figure 4:
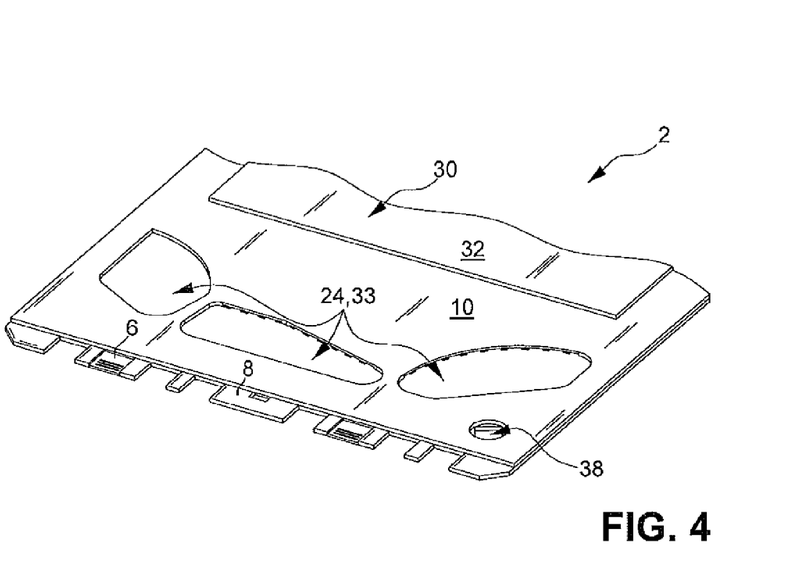
FIG. 4 is a fragmentary top perspective view of a single subassembly illustrated in FIG. 3.
Figure 5:
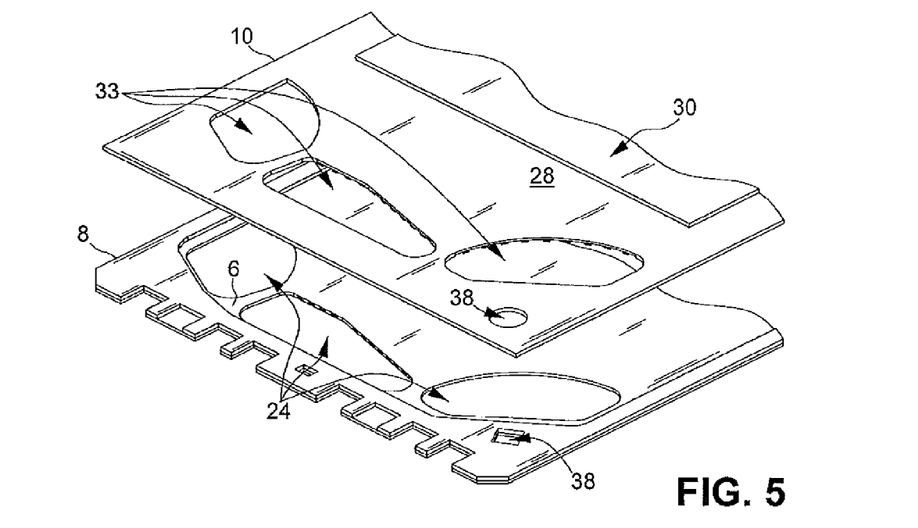
FIG. 5 is a fragmentary top perspective view of the single subassembly illustrated in FIG. 4, and further showing the unitized electrode assembly exploded from the view.
Figure 6:
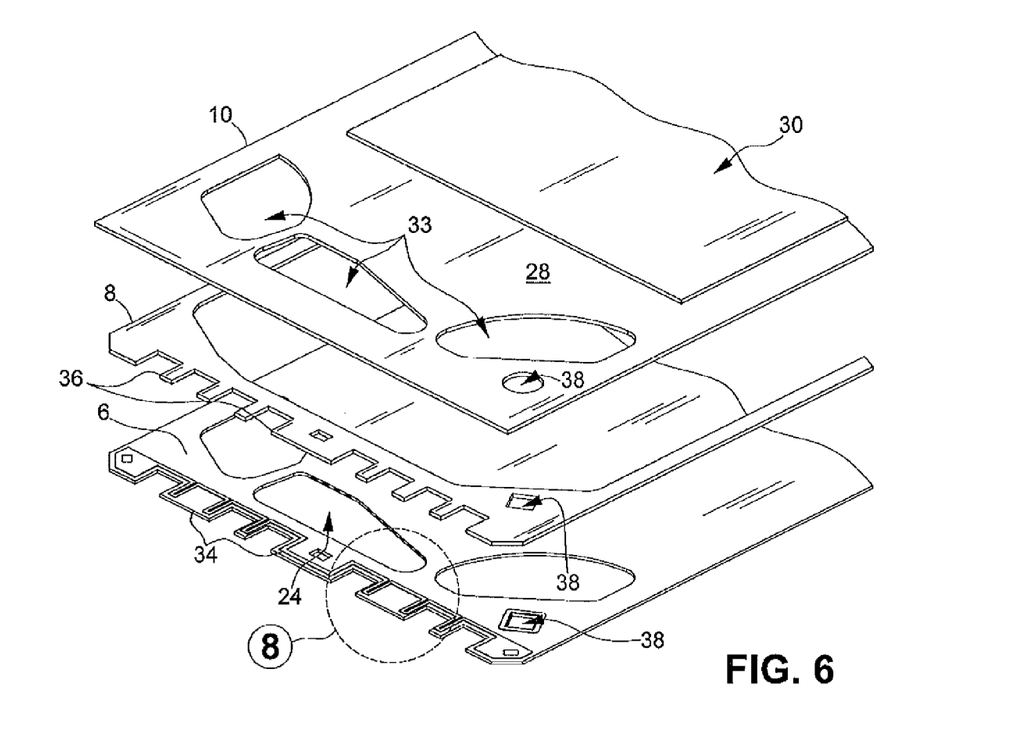
FIG. 6 is a fragmentary top perspective view of the single subassembly illustrated in FIGS. 4 and 5, and further showing both the insulating spacer and unitized electrode assembly exploded from the view.
Figure 7:
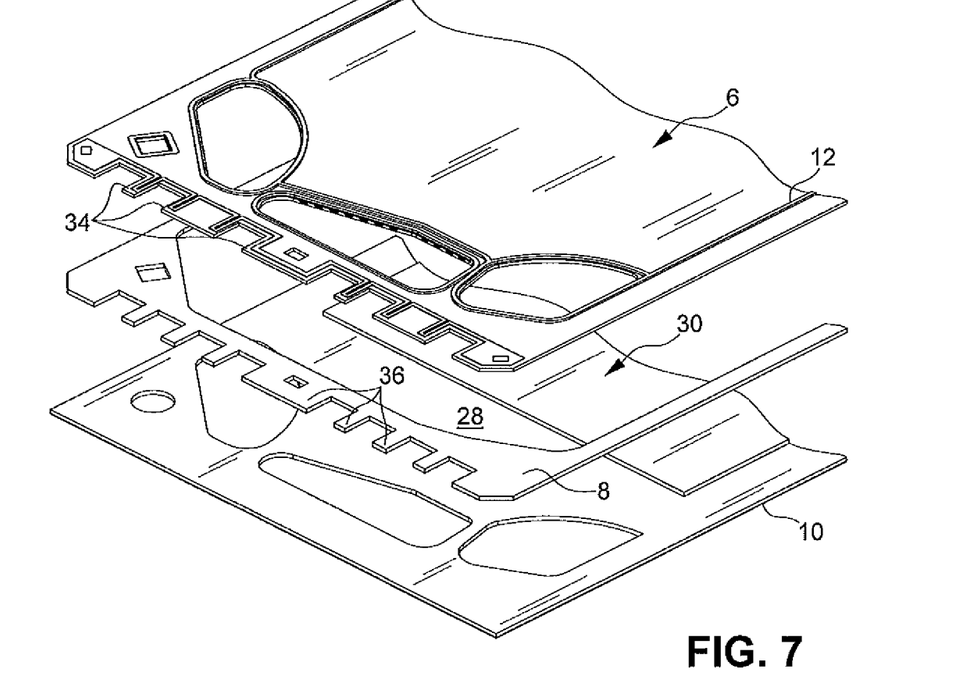
FIG. 7 is a fragmentary bottom perspective view of the single subassembly illustrated in FIG. 6.

The fuel cell 4, according to the present disclosure, is shown in FIG. 3. The fuel cell 4 includes the insulating spacer 8 disposed between a pair of the fuel cell plates 6. The fuel cell 4 may be provided by stacking a pair of the subassembly 2 as disclosed hereinabove. Likewise, the fuel cell stack 14 is shown in FIG. 3, and may be provided by stacking a plurality of the fuel cells 4 formed from the subassembly 2.

The addition of the insulating spacer 8 between the fuel cell plates 6 advantageously fills in or separates the fuel cell plates 6 and aids in distributing the load or the pressure that would otherwise result from the deformation of the plate edge at the perimeter 26 of the fuel cell plate 6. The rigidity of the insulating spacer 8 also permits the insulating spacer 8 to be utilized as the plate datum and provide alignment features for externally attached hardware. It should be understood that an outer profile of the fuel cell stack 14 is generally susceptible to deformation when the fuel cell stack 14 is not fully enclosed or encapsulated. The insulating spacer 8 is robust and militates against additional deformation of the fuel cell plates 6 over an operating lifetime of the fuel cell stack 14.

In the subassembly 2 of the present disclosure, the insulating spacer 8 has no additional adhesive and is held in position by adhesive existing on the subgasket 28 of the unitized electrode assembly 10. The subgasket 28 overlaps a portion of the insulating spacer 8, which is disposed adjacent to a seal gland area of the fuel cell plate 6. The adhesive on the subgasket 28 bonds the insulating spacer 8 to the subgasket 28, thereby affixing within the subassembly 2. Advantageously, the entire assembly process can occur in one step, thereby minimizing a complexity of manufacturing the fuel cell 4 with the subassembly 2 of the present disclosure.

A skilled artisan should also appreciate that the subassembly 2 militates against plate-to-plate contact and subsequent plate-to-plate shorting of the fuel cell 4 at the edges of the perimeter 26 of fuel cell plates 6. The subassembly 2, including the insulating spacer 8, minimizes the deformation of the fuel cell plates 6 during operation. Moreover, the insulating spacer 8 militates against a tearing of a subgasket 28 at the edges of the perimeter 26 of the fuel cell plates 6, and permits for tolerance variation in an outer perimeter of the finished unitized electrode assembly 10. The employment of the insulating spacer 8 thereby negates any need to trim the outer perimeter of the subgasket 28 after assembly of the fuel cell 4.

While certain representative embodiments and details have been shown for purposes of illustrating the invention, it will be apparent to those skilled in the art that various changes may be made without departing from the scope of the disclosure, which is further described in the following appended claims.

What is claimed is:

1. A subassembly for a fuel cell, comprising:
a fuel cell plate having a first side and a second side, each of the first side and the second side including a flow field disposed between a pair of headers;
an insulating spacer abutting the first side of the fuel cell plate and disposed adjacent a perimeter of the fuel cell plate, wherein the insulating spacer includes perimeter elements disposed thereon projecting outwardly from the subassembly;
a unitized electrode assembly including a subgasket and a membrane electrode disposed between a pair of diffusion medium layers, the membrane electrode assembly including an electrolyte membrane sandwiched between a pair of electrodes, the subgasket surrounding and coupled to the membrane electrode assembly and abutting the insulating spacer; and
an elastomeric seal abutting the second side of the fuel cell plate.

2. The subassembly of claim 1, wherein an adhesive is disposed between the insulating spacer and the subgasket of the unitized electrode assembly.

3. The subassembly of claim 2, wherein the adhesive is a layer of thermal adhesive disposed on the subgasket.

4. The subassembly of claim 1, wherein the insulating spacer has a rigidity sufficient to militate against a puncturing thereof by a deformed edge at the perimeter of the fuel cell plate, under a pressure associated with compression of the fuel cell during operation.

5. The subassembly of claim 4, wherein the insulating spacer has a Young's modulus of at least about 2700 MPa and a tensile strength of at least about 50 MPa.

6. The subassembly of claim 4, wherein the insulating spacer is formed from an electrically nonconductive and non-elastomeric material.

7. The subassembly of claim 6, wherein the insulating spacer is formed from one of a plastic and a composite material.

8. The subassembly of claim 7, wherein the insulating spacer is one of polyethylene terephthalate and polyethylene naphthalate.

9. The subassembly of claim 4, wherein the insulating spacer has a thickness from about twenty-five percent (25%) to about one hundred percent (100%) greater than an average thickness of the fuel cell plate.

10. The subassembly of claim 1, wherein at least one of the headers of the fuel cell plate includes perimeter elements disposed thereon and outwardly projecting from the subassembly, and the perimeter elements of the insulating spacer substantially corresponding with at least a portion of the perimeter elements of the fuel cell plate.

11. The subassembly of claim 10, wherein a portion of the perimeter elements of the fuel cell plate and the insulating spacer are alignment features for rough alignment and attachment of external components to the subassembly.

12. The subassembly of claim 10, wherein at least one of the perimeter elements of the fuel cell plate is exposed and configured for electrical communication.

13. The subassembly of claim 12, wherein the insulating spacer covers a portion of the exposed one of the perimeter elements of the fuel cell plate.

14. The subassembly of claim 1, wherein the insulating spacer follows a contour of a perimeter of the fuel cell plate, and overhangs the perimeter of fuel cell plate by an amount sufficient to ensure electrical insulation of the fuel cell plate.

15. The subassembly of claim 1, wherein the insulating spacer includes datum holes that cooperate with datum holes formed in the fuel cell plate and the subgasket of the unitized electrode assembly to align the insulating spacer, the fuel cell plate, and the unitized electrode assembly during assembly of the fuel cell.

16. The subassembly of claim 1, wherein each of the fuel cell plate and the subgasket include apertures that form one of an anode inlet, an anode outlet, a cathode inlet, a cathode outlet, a coolant inlet, and a coolant outlet when the fuel cell is assembled.

17. The subassembly of claim 16, wherein the insulating spacer is disposed outboard from the elastomeric seal that surrounds the apertures of the fuel cell plate.

18. The subassembly of claim 1, wherein the fuel cell plate includes stamped form features adjacent the insulating spacer and facilitating the retaining of the insulating spacer when the fuel cell is assembled.

19. A fuel cell, comprising:
a pair of sub-assemblies arranged in a stack, each of the sub-assemblies including a fuel cell plate having a first side and a second side, each of the first side and the second side including a flow field disposed between a pair of headers, an insulating spacer abutting the first side of the fuel cell plate and disposed adjacent to a perimeter of the fuel cell plate, wherein the insulating spacer includes perimeter elements disposed thereon projecting outwardly from the subassembly, a unitized electrode assembly including a subgasket and a membrane electrode assembly disposed between a pair of diffusion medium layers, the membrane electrode assembly including an electrolyte membrane sandwiched between a pair of electrodes, the subgasket surrounding and coupled to the membrane electrode assembly and abutting the insulating spacer, and an elastomeric seal abutting the second side of the fuel cell plate, wherein the elastomeric seal of one of the sub-assemblies abuts the subgasket of the other of the sub-assemblies.

20. A fuel cell stack, comprising:

a plurality of fuel cells arranged in a stack, at least one of the fuel cells include a pair of sub-assemblies arranged in a stack, each of the sub-assemblies including a fuel cell plate having a first side and a second side, each of the first side and the second side including a flow field disposed between a pair of headers, an insulating spacer abutting the first side of the fuel cell plate and disposed adjacent to a perimeter of the fuel cell plate, wherein the insulating spacer includes perimeter elements disposed thereon projecting outwardly from the subassembly, a unitized electrode assembly including a subgasket and a membrane electrode assembly disposed between a pair of diffusion medium layers, the membrane electrode assembly including an electrolyte membrane sandwiched between a pair of electrodes, the subgasket surrounding and coupled to the membrane electrode assembly and abutting the insulating spacer, and an elastomeric seal abutting the second side of the fuel cell plate, wherein the elastomeric seal of one of the sub-assemblies abuts the subgasket of the other of the sub-assemblies.

* * * * *